US012651422B1

(12) United States Patent
Yadav et al.

(10) Patent No.: US 12,651,422 B1
(45) Date of Patent: Jun. 9, 2026

(54) GENERATION OF VIRTUAL GARMENT IMAGES

(71) Applicant: Amazon Technologies, Inc., Seattle, WA (US)

(72) Inventors: Vivek Yadav, Lakewood, CO (US); Himanshu Arora, Sunnyvale, CA (US); Farah Kassim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 18/542,303

(22) Filed: Dec. 15, 2023

(51) Int. Cl.
| | |
|---|---|
| *G06T 19/20* | (2011.01) |
| *G06T 7/10* | (2017.01) |
| *G06T 15/04* | (2011.01) |
| *G06V 20/60* | (2022.01) |
| *G06V 40/10* | (2022.01) |

(52) U.S. Cl.
CPC ................ *G06T 19/20* (2013.01); *G06T 7/10* (2017.01); *G06T 15/04* (2013.01); *G06V 20/60* (2022.01); *G06V 40/10* (2022.01); *G06T 2200/24* (2013.01); *G06T 2207/10024* (2013.01); *G06T 2207/20081* (2013.01); *G06T 2207/30196* (2013.01); *G06T 2210/16* (2013.01); *G06T 2219/2012* (2013.01)

(58) Field of Classification Search
CPC ............ G06T 7/10; G06T 15/04; G06T 19/20
See application file for complete search history.

(56) References Cited

U.S. PATENT DOCUMENTS

| | | | | |
|---|---|---|---|---|
| 10,311,508 | B2 * | 6/2019 | Reed ...................... | A41H 3/007 |
| 2024/0029358 | A1 * | 1/2024 | Sharma ................. | G06T 17/205 |
| 2024/0119681 | A1 * | 4/2024 | Sholl ..................... | G06V 10/60 |

* cited by examiner

*Primary Examiner* — Matthew Salvucci
(74) *Attorney, Agent, or Firm* — Knobbe, Martens, Olson & Bear, LLP

(57) ABSTRACT

Systems and methods are provided for transferring color from a candidate garment not suitable for a virtual try-on experience for a user to a target garment of an image suitable for the virtual try-on experience. The source and target images for transferring color may be determined utilizing an amount of overlap of 3D segmentation masks for a candidate garment depicted in a candidate source image against the target garment depicted in a target image to identify that the candidate garment is suited for color transfer based on the comparison. Color or texture may then be transferred to the target garment based on image data of the identified candidate garment.

20 Claims, 6 Drawing Sheets

GENERATION OF VIRTUAL GARMENT IMAGES

BACKGROUND

There are a variety of user experiences offered by different online shopping services for enabling users to browse garments or clothing items available for purchase. Typically a user may be shown a stock image of a garment item, such as a shirt or dress, along with information about the item, such as available sizes. While some efforts have been made to present a preview or rendering of how a given garment may appear when worn by a specific user or on a body similar to the user's body proportions, there are challenges in accurately presenting visually how a particular garment or set of garments would look when worn by a particular person.

BRIEF DESCRIPTION OF THE DRAWINGS

Embodiments of various inventive features will now be described with reference to the following drawings. The drawings are provided to illustrate example embodiments described herein and are not intended to limit the scope of the disclosure.

DETAILED DESCRIPTION

Generally, aspects of the present disclosure relate to applying color transfer among related images of a garment to generate new images that can be used to provide a more consistent virtual try-on (VTO) experience. VTO technology, or user-specific garment rendering, may be implemented, in some embodiments, by digitally overlaying image data of one or more products on top of a customer image, and allows the customer to virtually try on garments before purchase. In a VTO experience, only a certain number of images for garments in a catalog may be suitable for VTO. For example, a given VTO implementation may be configured to place garment images on a front-facing human body with arms hanging down to the side, whereas many seller-provided images or other images stored in association with garment items in an electronic catalog may be from different angles, have different body poses, be cropped, etc. Therefore, the coverage of VTO (e.g., the percent of garment items in a catalog that are configured for VTO, via having a suitable image designated for VTO) may be low in existing systems. However, many images of garments listed in the catalog that are not suitable for VTO differ from a suitable image only in the base color, pattern, texture, or design, etc. of the garment. For example, a given garment image for a particular shirt may only have the blue version of the shirt available for VTO, while in the catalog there exist three other color variations of the shirt, not suitable for VTO (e.g., without a suitable image). In this scenario, a user may only use VTO functionality with respect to the blue shirt, despite there being three other colors of the shirt listed in the catalog.

To address at least a portion of the above-described deficiencies, a color transfer system, as described herein, can implement one or more modules or services to (1) filter catalog images inappropriate for color transfer, (2) select a best catalog image from which to transfer color to (e.g., a garment image suitable for VTO), and (3) transfer the color from the garment in the best catalog image to the suitable garment image.

Giving customers an ability to try on multiple related garments of various colors or designs as described herein allows them to have a more consistent experience with VTO. The newly generated VTO images can also be used to enhance homogeneity of the catalog images. Depending on the available catalog images and coverage, the implementation of color transfer as described herein may more than double the number of garments available for VTO.

The foregoing aspects and many of the attendant advantages of this disclosure will become more readily appreciated as the same become better understood by reference to the following description, when taken in conjunction with the accompanying drawings.

Figure 1A:
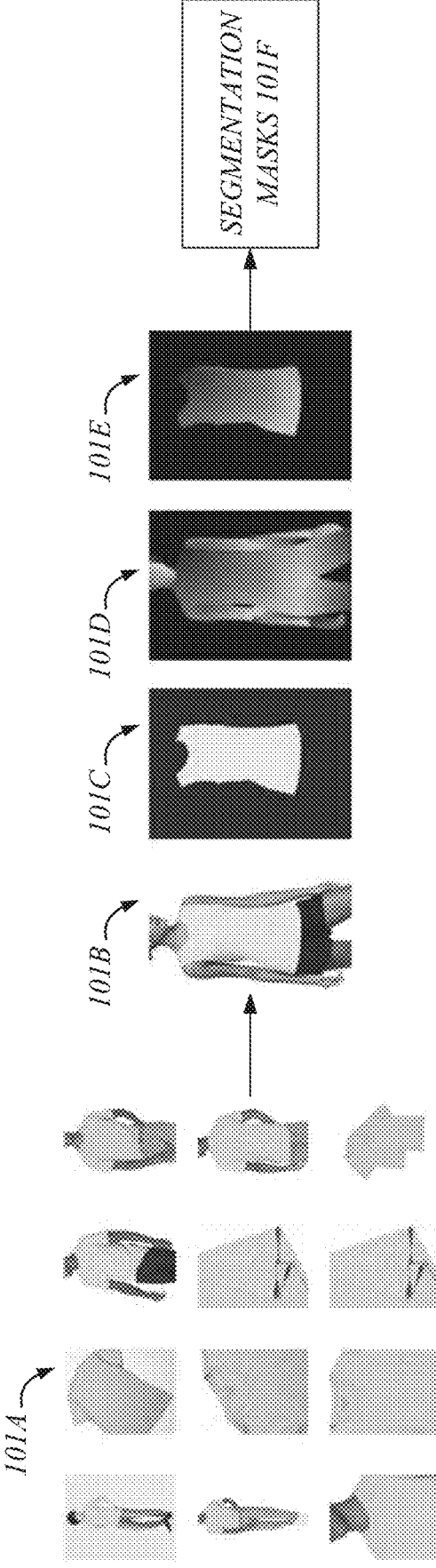
FIGS. 1A-C provide graphical representations of various steps in a process of selecting an image for color transfer and applying the color to a suitable image.
Figure 1B:
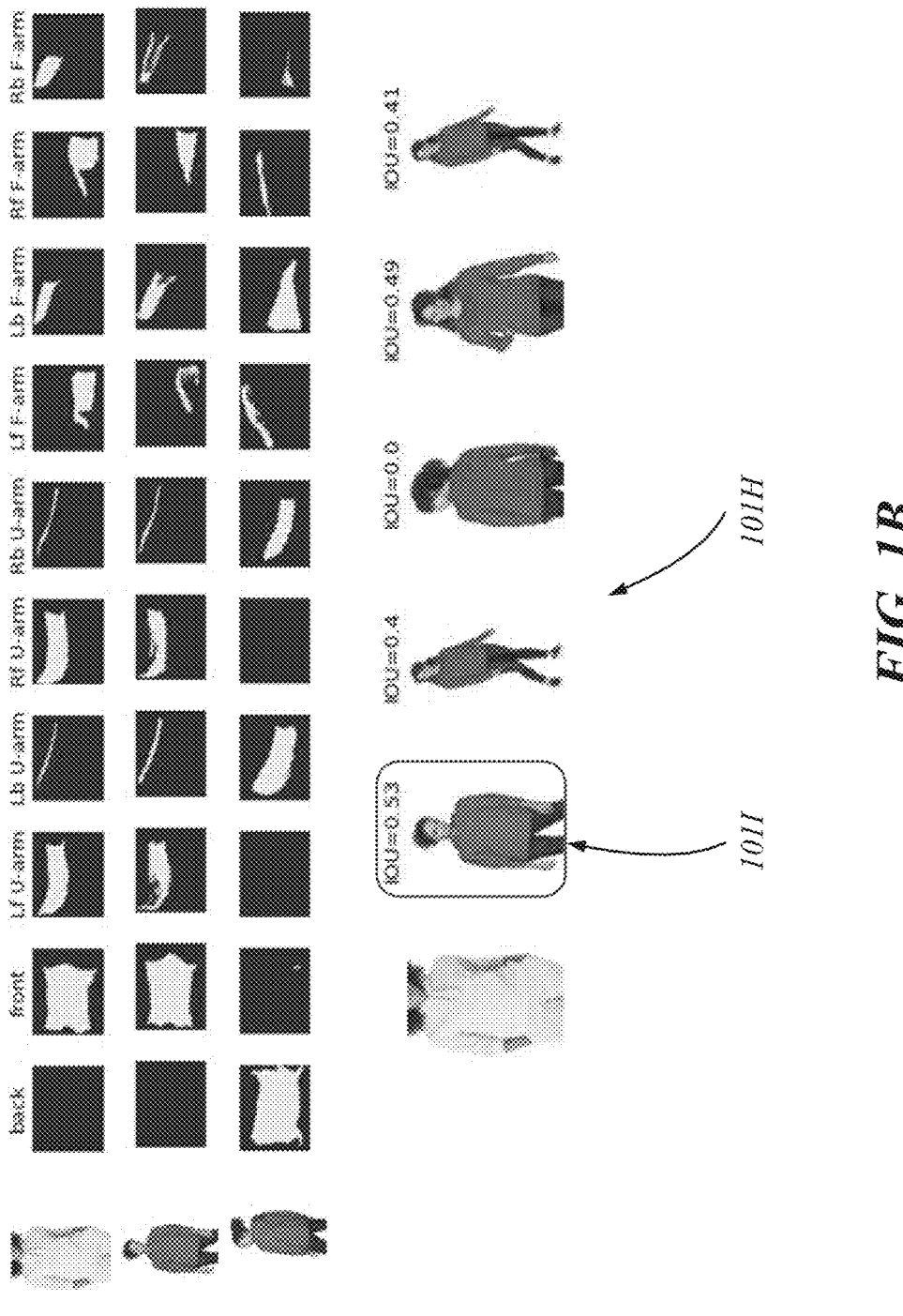
Figure 1C:
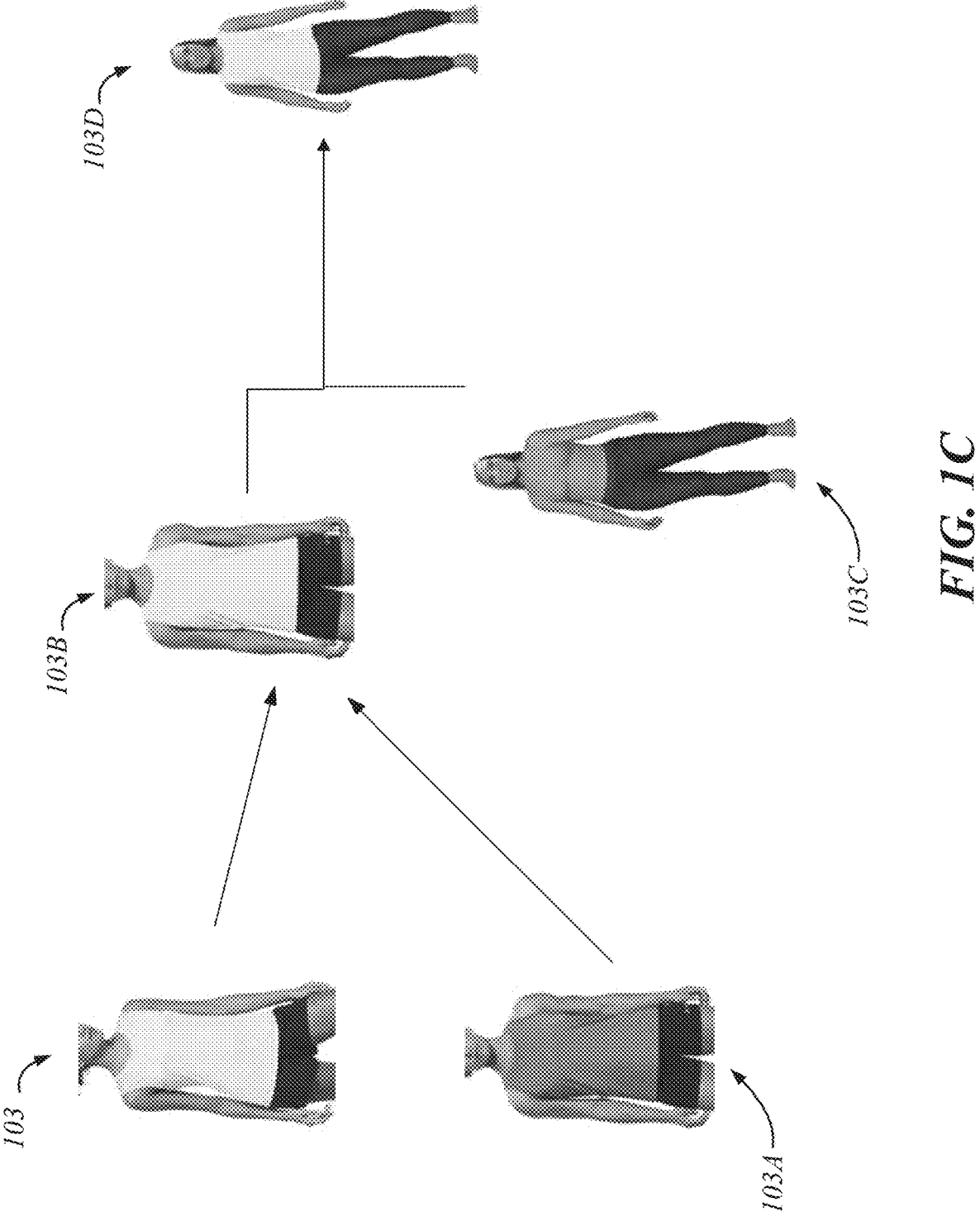

FIGS. 1A-C illustrate the process of selecting an image not suitable for VTO and transferring color from that image's garment to a garment in an image that is suitable for virtual try on. Before color transfer begins, the system may initially filter the catalog image data to images that contain candidate garments on a model. The catalog may contain multiple images that are related to a garment but are not images of the garment that are suitable for VTO. For example, there may be images that contain size charts, images with text annotations describing material or garment features (e.g., sleeve length, moisture wicking, etc.), and additional inspirational images. To determine whether an image is unsuitable for VTO in this way (which may only represent a portion of the images that are not suitable for VTO), the system may apply a text detection model to remove images with a certain number of text boxes. In some embodiments, the number of text boxes may be a specified threshold where images containing above or below the threshold are filtered out, depending on the embodiment.

The system may also apply a human detection model to filter out images with a certain number of human bodies in the image, such as images with multiple human bodies or no human bodies. For example, an image with multiple human bodies may be an image with various poses of the garment and therefore is unsuitable for VTO. As another example, an image with no human bodies may be the garment alone or a segment of the garment and is also unsuitable for VTO (e.g., because using a full view of the garment as worn by a human body as a base image for VTO may result in a more realistic VTO output).

FIG. 1A illustrates the initial process in the color transfer system where the candidate images are analyzed for color transfer suitability. The image catalog may contain garment images with images suitable for VTO, where the image can be used by a customer for VTO, and unsuitable for VTO, where the image cannot be used by a customer for VTO. Referring to FIG. 1A, the candidate images 101A represent images not suitable for VTO in the catalog that are a variant of a target image that is suitable for VTO. A variant of an image may be the same garment, but with a different color, pattern, texture, design, pose, zoom level, etc. For example, the candidate images 101A are a variant of the target image because they may contain the same or similar garment as the target image, but the garment is a different color, pattern, texture, design, etc. of the target garment in the target image. The candidate images 101A may also contain the same or similar target garment, but modeled in different poses or angles, displayed at various zoom levels, depicted as folded, etc. The candidate images 101A may all be associated with a single item in an electronic catalog (e.g., may be twelve image files that are each associated with, and in this case depict, a particular shirt in a particular color that has not yet had a VTO-suitable image assigned/selected).

The system may convert each of the candidate images 101A to a densepose 3D model 101D for each candidate image. The system may take a single candidate image 101B and determine the area of the body covered by the garment 101C. Then the densepose 3D model 101D utilizes the determined area of the body covered by the garment 101C to get the densepose area covered by the body 101E. In some embodiments, a deformable human body model, such as the Skinned Multi-Person Linear ("SMPL") model, may be used to generate the 3D body model 101D, such as in the form of a 3D mesh. The SMPL model is a skinned vertex-based model that accurately represents a wide variety of 3D human body shapes in natural human poses, which deform naturally with pose and exhibit soft-tissue motions like those of real humans. The parameters of the model are learned from data including a rest pose template, blend weights, pose-dependent blend shapes, identity-dependent blend shapes, and a regressor from vertices to joint locations. The SMPL model enables training its entire model from aligned 3D meshes of different people in different poses. More information regarding implementation of an SMPL model can be found in U.S. Pat. No. 10,395,411 (hereinafter "the '411 Patent"), to Black et al., issued Aug. 27, 2019, entitled "SKINNED MULTI-PERSON LINEAR MODEL," which is incorporated herein by reference.

As described in the '411 Patent, using the SMPL model to generate a 3D human body model in a given instance may generally include, in one embodiment, obtaining a shape-specific template of a body model defined by a number of vertices (where the shape-specific template may have been generated by applying a shape-specific blend shape to vertices of a template shape), applying a pose-dependent blend shape to the vertices of the shape-specific template (e.g., displacing the vertices of the shape-specific template into a pose- and shape-specific template of the body model), and then generating a 3D model articulating a pose of the body model based on the vertices of the pose- and shape-specific template of the body model. Thus, an SMPL-based model may be configured to receive input that includes a vector of shape parameters and a vector of pose parameters, which the SMPL model then applies with respect to a template 3D human model in order to generate a 3D human model that maps the shape and pose parameters to vertices. Accordingly, body measurements of a particular person may be used in combination with the SMPL model to obtain or generate a 3D mesh of a human body that approximates the appearance of a particular person's body when rendered for display.

The densepose 3D model 101D may be generated based on an extraction of a 3D mesh model of a human body from the 2D image of the given candidate image. Densepose, or dense human pose estimation, maps pixels considered to be of a human from a 2D image to a 3D surface-based representation of the human body. The densepose establishes dense correspondences between the 2D image pixels and the 3D surface-based representation. The surface-based representation is split into charts and estimated, for each pixel, chart coordinates such as (U, V), where each part of the human body is parametrized by U and V coordinates. The densepose 3D model 101D can depict how the body appears underneath clothing. Densepose is a known project and process (utilizing a Mask-RCNN architecture with Feature Pyramid Network (FPN) features, and ROI-Align pooling in a current implementation), and thus need not be described in detail herein. More details regarding densepose can be found in Güler, Riza Alp, et al., "DensePose: Dense Human Pose Estimation In The Wild," CoRR, vol. abs/1802.00434, 2018. In some embodiments, the system may use an adapted model of densepose, or may use other annotation pipeline or processes instead of densepose in order to map pixels of a 2D image of a human to the 3D surface of the human body.

Using the densepose 3D model 101D, the system can generate segmentation masks 101F, which will be discussed in further detail below with respect to FIG. 1B.

FIG. 1B illustrates the calculation of overlap between garments using segmentation masks 101F. Using the densepose 3D model 101D to depict the body associated with each image and the densepose area covered by the body 101E to depict clothing portions of each garment, the system can extract the part of the body covered by the garment in the image. For example, system can determine using these models that the garment covers the legs, torso, etc. Additionally, the densepose 3D model 101D may be segmented according to the body parts within the covered area of the body using the densepose area covered by the body 101D.

Once the system determines which part(s) of the body is covered by the garment, the system can compute segmentation masks 101F for smaller sections of body parts. The smaller sections of body parts are within the covered body part. The segmentation masks 101F are computed using the segmented garment densepose from the covered part of the body for each garment image. The system may extract body part masks for different garment specific parts to compute segmentation masks 101F. For example, for a garment that is a top, the segmentation masks may be portions of the torso and arms, for a garment that is pants, the segmentation masks may be portions of the legs and torso, and for garments that are dresses, the segmentation masks may be portions of the legs, torso, and arms and so on.

In the example of FIG. 1B, the garment for segmentation masks 101F is a sweater, which covers the torso and arms. As such, the segmentation masks include masks for the back, front, left front upper arm, left back upper arm, right front upper arm, left front forearm, left back forearm, right front forearm, and right back forearm.

To determine the amount of overlap between the target image and the candidate images 101A, the system compares the segmentation masks 101F of the target image and the candidate images, as depicted in the overlap calculations 101H. The densepose masks may be unwrapped (e.g., flattened) to standardize the masks. The overlap is calculated between the garment-specific unwrapped densepose masks of the suitable target image and the garment-specific unwrapped densepose masks of the candidate images 101A. In an embodiment, the overlap may be computed using an intersection over union calculation, which measures the overlap between the segmentation masks 101F of the target image and the candidate images. In some embodiments, the overlap may be represented as a percentage or a number normalized on a scale other than 1-100 (e.g., between zero and one). Optionally, the calculated overlap may be an overlap score indicating the amount of overlap.

The system then may rank the candidate images 101A based on the amount of overlap calculated for each candidate image. In an embodiment, the candidate images 101A may be ranked in decreasing order of overlap, where the highest amount of overlap indicates that the particular candidate image is the most similar to the target image. However, this is not meant to be limiting or required, as in other embodiments, other amounts of overlap may indicate the level of similarity between the images (e.g., low amount of overlap indicates high level of similarity, etc.). Based on the amount of overlap, the system can select one of the candidate images 101A for color transfer, as depicted by the selected candidate image 1011.

FIG. 1C illustrates the process by which the selected candidate image is used for color transfer on a user image in the VTO experience. Using a selected color transfer image 103, such as the selected candidate image 1011, and the target image 103A, the system can take the color of the selected color transfer image 103 and transfer it to the garment from the target image 103A. The color from the selected color transfer image 103 on the target garment from the target image 103A is illustrated in the color transferred image 103B. This image may then be added to the catalog as suitable for virtual try on.

While transferring color is often used as an example visual attribute that is transferred between garment images herein, texture, pattern, and other visual attributes beyond a solid color could alternatively be transferred between images once a source and target image is selected as indicated above.

In an embodiment, color transfer may occur using histogram matching, such as channel wise histogram matching. Channel wise histogram matching uses a computation of a cumulative distribution of colors and replaces colors from the source image (e.g., the selected color transfer image 103) to the suitable image (e.g., the target image 103A) based on the computation. However, this is not meant to be required or limiting. In other embodiments, color transfer may occur using optimal transport, or other deep learning methods.

In another embodiment, texture transfer may occur using texture unwrapping, stable diffusion, or other generative artificial intelligence (AI) based methods. The texture unwrapping method estimates height maps (e.g., where shadows are in the image) and bump maps (e.g., where deformations or gradients are in the image) for both the source image (e.g., the selected color transfer image 103) and the suitable image (e.g., the target image 103A). Height and bump maps are used to estimate where the edges of the garment are for each image. The height maps and bump maps from the source image are used to unwrap the texture of the garment based on the estimated edges of the garment. Then, the height maps and bump maps from the suitable image are used to project the suitable image garment onto the unwrapped texture. Stable diffusion is a generative AI model that produces images based on a text or image prompt. Texture may be mapped using stable diffusion or other generative AI based methods by prompting the model to transfer texture between the images.

The user image 103C illustrates an image submitted by a user to use for the VTO experience. This user image 103C may be received any time after the color transferred image 103B has been generated (for example, the user may not interact with the system for days or weeks after the relevant garment has been set up for VTO experiences via generation and storage of the color transferred image 103B). The system may then utilize the color transferred image 103B for virtual try on with the user image 103C. Known techniques can be used to present the garment from the color transferred image 103B on the user image 103C, such as positioning the garment over the appropriate body part(s) and applying geometric manipulations (scaling, skewing, etc.) for the garment to fully cover the appropriate body part(s). However, while the color transferred image 103B depicts a human wearing the garment in addition to the garment itself, the system may store the color transferred image 103B as just the cropped garment alone (e.g., without body parts). The color transferred user image 103D shows the color transferred image 103B as depicted on the user image 103C using VTO.

However, this is not meant to be limiting or required. In other embodiments, the system may apply the color transferred image 103B to a model image, as opposed to a user image. For example, the system may apply the color transferred image 103B to images of other models with various body types or poses. In this way, the resulting image can be used to expand the number of images with that color on different models and body types.

Figure 2:
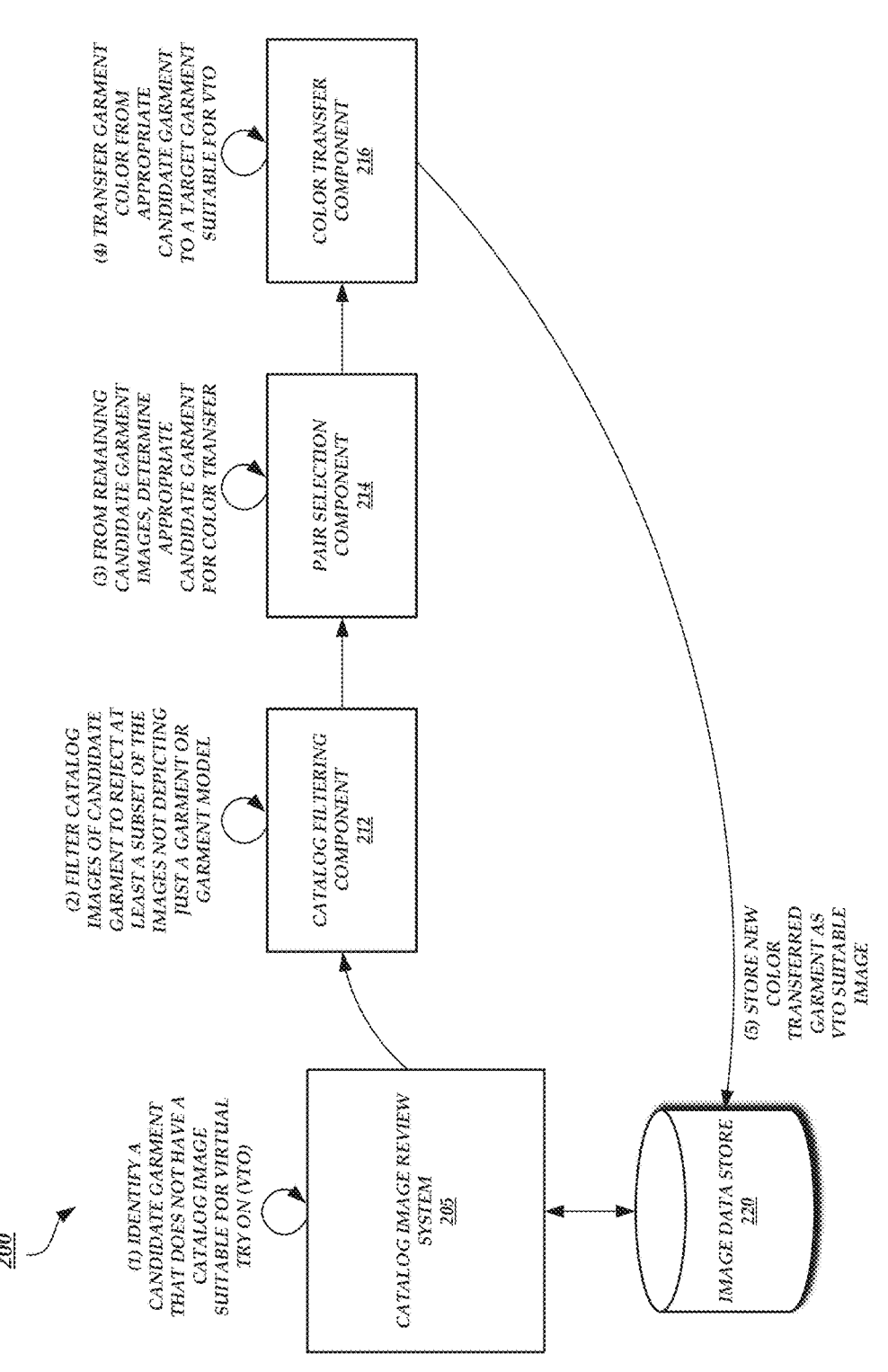
FIG. 2 is a block diagram depicting an illustrative environment and data flow in which a catalog image review system interacts with other components of a system to determine appropriate images for color transfer.

FIG. 2 is a block diagram depicting an illustrative environment 200 in which a catalog image review system 205 interacts with other components of a system to determine appropriate images for color transfer and add new images for color transfer to the catalog. Within, or in communication with, the catalog image review system 205, there are several components including the catalog filtering component 212, the pair selection component 214, and the color transfer component 216. The image data store 220 contains a catalog of images both suitable and unsuitable for VTO. The image data store 220 may include attributes, flags, or other association data indicating which images have been approved or designated for use in VTO experiences. At (1), the catalog image review system 205 communicates with the image data store 220 and identifies a candidate garment from the catalog of images in the image data store 220 that is not suitable for virtual try on (e.g., may identify a garment that has no associated images approved for VTO).

At (2), the catalog filtering component 212 filters catalog images to filter out at least a subset of the candidate images not depicting just a garment or a model wearing the garment. For example, as detailed above, images may be filtered out for containing a certain amount of text boxes, multiple human bodies, etc. At (3), the pair selection component 214 can determine the appropriate candidate garments from the remaining candidate garment images after the filtering step for color transfer using the process outlined above with respect to FIGS. 1A-C.

At (4), the color transfer component 216 can transfer the garment color from the appropriate candidate garment to a target garment in an image that is suitable for VTO in the catalog (as identified, for example, via a tag or attribute associated with the target image in a data store indicating suitability for VTO). The target garment may be a variant of the candidate garment, where the variant of an image may be the same garment, but with a different color, pattern, texture, design, pose, zoom level, etc. For example, the target garment may be a variant of the candidate garment because it may contain the same or similar garment as the candidate garment, but the garment is a different color, pattern, texture, design, etc. of the candidate garment in the candidate image. The target garment and the candidate garment may all be associated with a single item in an electronic catalog, but with different variations of that item (e.g., may be twelve image files that are each associated with, and in this case depict, a particular shirt in various colors, some of which do not yet have a VTO-suitable indication stored). Once the color transfer is completed, the system can store the new color transferred garment as a VTO suitable image, associated with the corresponding candidate garment, in the image data store 220. Therefore, in the future, that garment and color can be used for VTO using the new image.

Figure 3:
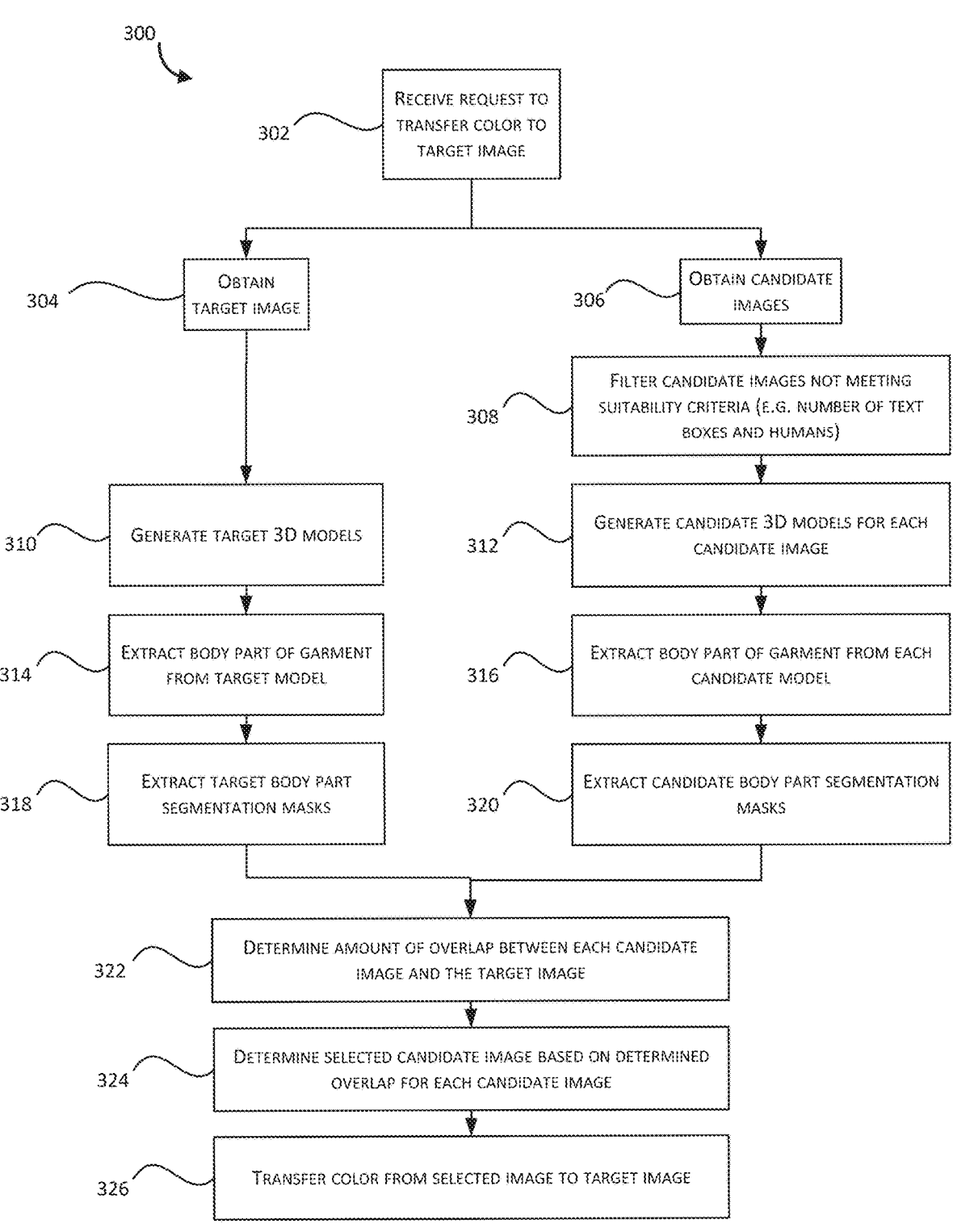
FIG. 3 is a flow chart depicting an example routine for applying color transfer among related images of a garment.

FIG. 3 is a flow chart depicting an illustrative routine 300 for applying color transfer among related images of a garment. At block 302, the routine may receive a request to transfer color to a target image. The routine 300 may also be initiated automatically based on a routine schedule (e.g., every hour, day, or week, etc.), in response to a triggering event (e.g., a new garment and/or image(s) being added to an electronic catalog), or both. For example, a routine schedule may set the routine 300 to automatically be performed every week and therefore, the routine 300 may be performed every week according to the set schedule. Additionally, a triggering event, for example, may be a new color being added to the catalog, a new related garment being rejected for virtual try on, a new image being stored in the database that's ready for VTO, etc., where an event occurrence in the network triggers initiation of the routine 300.

Next, at block 304, the routine obtains the target image. The target image may be a garment image in the catalog that is determined suitable for VTO (e.g., previously determined as such, with a VTO-suitable tag or attribute stored in a data store) and that has several associated candidate images that are not suitable for VTO in the catalog and are a variant of a target image. A variant of an image may be the same or substantially similar garment (e.g., same brand and style), but with a different color, pattern, texture, design, pose, zoom level, etc. For example, the candidate images may be a variant of the target image because they may contain the same or similar garment as the target image, but the garment is a different color, pattern, texture, design, etc. of the target garment in the target image. The candidate images may also contain the same or similar target garment, but modeled in different poses or angles, displayed at various zoom levels, depicted as folded, etc. The candidate garment images may all be associated with a single item in an electronic catalog (e.g., may be twelve image files that are each associated with, and in this case depict, a particular shirt in a particular color that has not yet had a VTO-suitable image assigned/ selected). Using the target image, at block 310, the routine generates one or more 3D models of a human body depicted in the target image. The 3D model(s) may include densepose and segmentation models, as described above with respect to FIGS. 1A and 1B. At block 314, the body parts covered by the garment in the target image are extracted from the target models, as discussed above. At block 318, the body part segmentation masks are extracted from the target models, as discussed above. It will be appreciated that while not illustrated in FIG. 3, the system may store the extracted target body part segmentation masks in association with a given target image once they are first determined, such that blocks 310, 314 and 318 need not be repeated the next time that the system implements method 300 with respect to the same target image.

At block 306, which may be initiated before, after or in parallel with any of the blocks 304, 310, 314 and 318 discussed above, the routine obtains the candidate images (e.g., candidate images associated with the target image as described above). Following block 306, at block 308, the candidate images are filtered out based on whether each image meets suitability for color transfer criteria. For example, candidate images may be filtered out based on the number of text boxes the image contains or the amount of human bodies in the image that indicates the image is not suitable for color transfer. At block 312, 3D models for the humans depicted in each candidate image are generated, in the same manner as performed with respect to the target image above. The 3D models may be densepose and segmentation models, as described above with respect to FIGS. 1A and 1B. Using the models, the body part(s) covered by the garment is extracted from each candidate model at block 316. Then, at block 320, the body part segmentation masks are extracted from each candidate body part, as discussed above.

Although FIG. 3 illustrates blocks 304 and 306 being performed in parallel (e.g., concurrently), the illustration is provided by way of example only, and is not intended to be limiting or required. Similarly, although FIG. 3 illustrates blocks 310 and 312, blocks 314 and 316, and blocks 318 and 320 being performed in parallel, the illustration is provided by way of example only, and is not intended to be limiting or required. In some embodiments, blocks 304, 306, 308, 310, 312, 314, 316, 318, and 320 may be performed serially (e.g., one after the other), asynchronously, or in some other manner. For example, blocks 304, 306, 308, 310, 312, 314, 316, 318, and 320 may be performed in various sequences. In one example, block 304 is performed first, followed by block 306, followed by block 308, then block 310, and so on. Alternatively, block 306 is performed first, followed by block 308, followed by block 304, and then block 310, etc.

At block 322, the amount of overlap between each candidate image and the target image is determined using the segmentation masks from blocks 318 and 320. The determination of the amount of overlap is discussed in further detail with respect to FIG. 1B above. For example, the amount of overlap for each image could be represented as a percentage or a number normalized on a scale other than 1-100 (e.g., between zero and one), a numeric score, or a measurement of the intersection over union between the target image and each candidate image.

At block 324, one of the candidate images is selected for color transfer according to the amount of overlap for each candidate image determined in block 322. The process by which a candidate image is selected for color transfer is discussed in further detail with respect to FIG. 1B above. For example, to select a candidate image the amount of overlap (e.g., overlap score) may be compared to a threshold amount required to be a VTO suitable image or could be selected based on the highest or best score (above the VTO-suitable threshold).

At block 326, color is transferred from the garment of the selected candidate image from block 324 to the target garment of the target image. The process by which color is transferred is discussed in further detail with respect to FIG. 1C above. To transfer color, the color of the garment in the selected candidate image may be transferred to the garment in the target image to create a new image containing the target garment with the candidate image's garment color. While transferring color is often used as an example herein, texture, pattern, and other garment designs beyond a solid color could alternatively be transferred between images once a source or target image is selected as indicated above. The resulting image may then be stored for later use (not illustrated in FIG. 3), such as in connection with a VTO experience, as described above.

Figure 4:
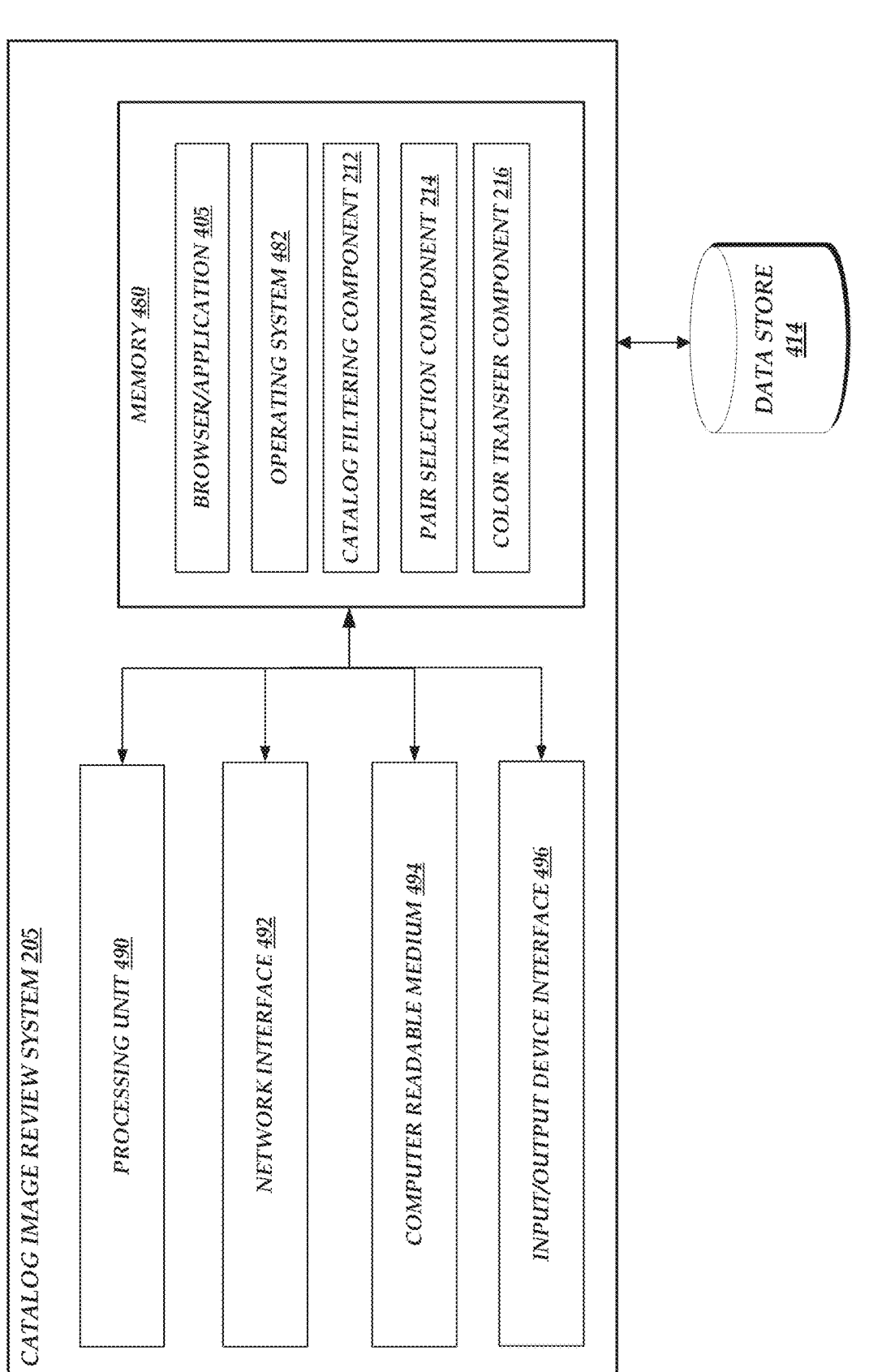
FIG. 4 shows an example computing device that may be used to implement aspects of the present disclosure.

FIG. 4 depicts a general architecture of a computing system implementing the catalog image review system 205 of FIG. 2. The general architecture of the system depicted in FIG. 4 includes an arrangement of computer hardware and software that may be used to implement aspects of the present disclosure. The hardware may be implemented on physical electronic devices, as discussed in greater detail below. The system may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 2.

As illustrated, the system includes a processing unit 490, a network interface 492, a computer readable medium drive 494, and an input/output device interface 496, all of which may communicate with one another by way of a communication bus. The network interface 492 may provide connectivity to one or more networks or computing systems. The processing unit 490 may thus receive information and instructions from other computing systems or services via the network. The processing unit 490 may also communicate to and from memory 480 and further provide output information for a display (not shown) via the input/output device interface 496. The input/output device interface 496 may also accept input from an input device (not shown).

The memory 480 may contain computer program instructions (grouped as units in some embodiments) that the processing unit 490 executes in order to implement one or more aspects of the present disclosure, along with data used to facilitate or support such execution. While shown in FIG. 4 as a single set of memory 480, memory 480 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 480 may store an operating system 482 that provides computer program instructions for use by the processing unit 490 in the general administration and operation of the catalog image review system 205. The memory 480 may further include computer program instructions and other information for implementing aspects of the present disclosure. For example, in one embodiment, the memory 480 includes the browser or other application 405, the operating system 482, the catalog filtering component 212, the pair selection component 214, and the color transfer component 216. The catalog filtering component 212, the pair selection component 214, and the color transfer component 216 may represent code executable to format, transmit, and receive network messages. The data store 414 may generally store various information used by the browser/application 405, such as one or more cookies identifying a user's account or browsing session, shopping cart information, one or more photographs or the user, cached rendered garment images received from the catalog image review system 205, etc. The data store 414 may be part of the catalog image review system 205, remote from the catalog image review system 205, and/or may be a network-based service.

The system of FIG. 4 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 4 as a catalog image review system 205, similar components may be utilized in some embodiments to implement other devices shown in the environment of FIG. 2 and described elsewhere herein.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only memory ("ROM"), erasable programmable read-only memory ("EPROM"), electrically erasable programmable read-only memory ("EEPROM"), registers, hard disk, a removable disk, a compact disc read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a memory configured to store specific computer-executable instructions; and
a processor in communication with the memory and configured to execute the specific computer-executable instructions to at least:
obtain a target image that has been designated as suitable for user-specific garment rendering, wherein the target image depicts at least a portion of a target body and a target garment, wherein the target garment is one of a plurality of garments listed in an electronic catalog;
identify a candidate garment that is indicated in the electronic catalog to be a variation of the target garment as indicated via a stored association between the candidate garment and the target garment, wherein the candidate garment does not have an associated image that is designated as suitable for user-specific garment rendering;
obtain candidate images associated with the candidate garment, wherein each of the candidate images (i) depict at least a portion of a candidate body and the candidate garment but (ii) are not suitable for user-specific garment rendering;
identify a subset of the candidate images passing an initial filter, wherein the initial filter filters out one or more images in which (a) text boxes depicted exceed a threshold number of text boxes or (b) more than one human body is depicted;
determine one or more body parts of the target body covered by the target garment based on dense correspondences between two or more first models generated from the target image;
determine, for each of the candidate images in the subset of candidate images, one or more body parts of a given candidate body covered by the given candidate garment based on dense correspondences between two or more second models generated from the given candidate image;
extract target body part segmentation masks for one or more portions of the target garment comprising segmented portions of the determined target body parts in the target body;
extract candidate body part segmentation masks for one or more portions of each candidate image in the subset of candidate images comprising segmented portions of the determined candidate body parts in the given candidate image;
determine, for each individual candidate image in the subset of candidate images, an amount of overlap for the individual candidate image based on a comparison between the candidate body part segmentation masks for the individual candidate image and the target body part segmentation masks for the target image;
identify a selected candidate image for color transfer from the subset of candidate images based on the amount of overlap for the individual candidate images; and transfer color from a selected candidate garment depicted in the selected candidate image to the target garment of the target image to create a color transferred image, wherein the color transferred image depicts the target garment with the color of the selected candidate garment, wherein the color transferred image is suitable for user-specific garment rendering of the selected candidate garment that did not previously have any image designated as suitable for user-specific garment rendering.

2. The system of claim 1, wherein the comparison between the candidate body part segmentation masks for each candidate image and the target body part segmentation masks for the target image uses an intersection over union calculation, wherein the intersection over union calculation measures the overlap between the candidate body part segmentation masks for an individual candidate image and the target body part segmentation masks for the target image and calculates an overlap score for each candidate image.

3. The system of claim 1, wherein color is transferred from a selected candidate garment of the selected candidate image to the target garment of the target image using histogram matching, wherein histogram matching uses a computation of a cumulative distribution of colors and replaces the colors from the target image.

4. The system of claim 1, wherein the processor is further configured to:

obtain a digital photograph of a user captured by a camera; and generate and cause display of a user interface that includes at least an initial depiction of the user in a display position of the user interface, wherein the user is depicted in the display position as wearing a color transferred garment of the color transferred image.

5. A computer-implemented method comprising:

obtaining a target image that has been designated as suitable for user-specific garment renderings, wherein the target image depicts at least a portion of a target body and a target garment;

identifying a candidate garment that is indicated in stored data to be a variation of the target garment as indicated via a stored association between the candidate garment and the target garment;

obtaining candidate images associated with the candidate garment, wherein each of the candidate images (i) depict at least a portion of a candidate body and the candidate garment but (ii) are not suitable for user-specific garment rendering;

determining one or more body parts of the target body covered by the target garment within the target image;

determining, for each individual candidate image of at least a subset of the candidate images, one or more body parts of a corresponding candidate body within the individual candidate image that are covered by the candidate garment;

extracting segmented portions of the determined target body parts from the target body;

extracting segmented portions of the determined candidate body parts from each of the at least a subset of the candidate images;

determining, for each individual candidate image of the at least a subset of the candidate images, an amount of overlap for the individual candidate image based on a comparison between the extracted segmented portions of the determined target body parts and the extracted segmented portions of the determined candidate body parts for the individual candidate image; and transferring at least one visual attribute from the candidate garment as depicted in a selected candidate image to the target garment, wherein the selected candidate image is selected based at least in part on the determined amount of overlap for the selected candidate image.

6. The computer-implemented method of claim 5, wherein extracting segmented portions of the determined target body parts from the target body is based on a type of the target garment.

7. The computer-implemented method of claim 5, wherein extracting segmented portions of the determined candidate body parts from each of the candidate images is based on a type of the candidate garment.

8. The computer-implemented method of claim 5, wherein the amount of overlap is based on an intersection over union calculation of the extracted segmented portions of the determined target body parts and the extracted segmented portions of the determined candidate body parts for each of the candidate images.

9. The computer-implemented method of claim 5, wherein transferring the at least one visual attribute comprises transferring texture, wherein transferring texture comprises applying texture unwrapping with respect to the candidate garment as depicted in the selected candidate image.

10. The computer-implemented method of claim 5, wherein transferring the at least one visual attribute comprises transferring texture, wherein transferring texture comprises using a generative artificial intelligence model to transfer the texture.

11. The computer-implemented method of claim 5, wherein transferring the at least one visual attribute comprises transferring color, wherein transferring color comprises using histogram matching to transfer the color.

12. The computer-implemented method of claim 5, further comprising:

obtaining a digital photograph of a user; and generating and causing display of a user interface that includes at least an initial depiction of the user in a display position of the user interface, wherein the user is depicted as wearing a color transferred garment comprising the target garment with the color transferred from the selected candidate image.

13. A system comprising:

computer-readable memory storing executable instructions; and one or more processors in communication with the computer-readable memory and programmed by the executable instructions to at least:

obtain a target image that has been designated as suitable for user-specific garment renderings, wherein the target image depicts at least a portion of a target body and a target garment;

identify a candidate garment that is indicated in stored data to be a variation of the target garment as indicated via a stored association between the candidate garment and the target garment;

obtain candidate images associated with the candidate garment, wherein each of the candidate images (i) depict at least a portion of a candidate body and the candidate garment but (ii) are not suitable for user-specific garment rendering;

determine one or more body parts of the target body covered by the target garment within the target image;

determine, for each individual candidate image of at least a subset of the candidate images, one or more body parts of a corresponding candidate body within the individual candidate image that are covered by the candidate garment;

extract segmented portions of the determined target body parts from the target body;

extract segmented portions of the determined candidate body parts from each of the at least a subset of the candidate images;

determine, for each individual candidate image of the at least a subset of the candidate images, an amount of overlap for the individual candidate image as compared to the target image; and transfer at least one visual attribute from the candidate garment as depicted in a selected candidate image to the target garment, wherein the selected candidate image is selected based at least in part on the determined amount of overlap for the selected candidate image.

14. The system of claim 13, wherein the extracted segmented portions of the determined target body parts from the target body are based on a type of the target garment.

15. The system of claim 13, wherein the extracted segmented portions of the determined candidate body parts from each of the candidate images are based on a type of the candidate garment.

16. The system of claim 13, wherein the amount of overlap is based on an intersection over union calculation of the extracted segmented portions of the determined target body parts and the extracted segmented portions of the determined candidate body parts for each of the candidate images.

17. The system of claim 13, wherein to transfer at least one visual attribute, the executable instructions cause the one or more processors to:

transfer texture, wherein transferring texture comprises applying texture unwrapping with respect to the candidate garment as depicted in the selected candidate image.

18. The system of claim 13, wherein to transfer at least one visual attribute, the executable instructions cause the one or more processors to:

transfer texture, wherein transferring texture comprises using a generative artificial intelligence model to transfer the texture.

19. The system of claim 13, wherein to transfer at least one visual attribute, the executable instructions cause the one or more processors to:

transfer color, wherein transferring color comprises using histogram matching.

20. The system of claim 13, wherein the one or more processors are further configured to:

obtain a digital photograph of a user; and generate and cause display of a user interface that includes at least an initial depiction of the user in a display position of the user interface, wherein the user is depicted as wearing a color transferred garment comprising the target garment with the color transferred from the selected candidate image.

* * * * *